United States Patent [19]

Quinlivan

[11] 4,285,978

[45] Aug. 25, 1981

[54] METHOD FOR DECORATING BAKED GOODS AND THE LIKE

[76] Inventor: Sharon L. Quinlivan, 13302 Finsbury Ct., Laurel, Md. 20811

[21] Appl. No.: 180,003

[22] Filed: Aug. 21, 1980

Related U.S. Application Data

[63] Continuation of Ser. No. 22,627, Mar. 21, 1979, abandoned, which is a continuation-in-part of Ser. No. 904,030, May 8, 1978, abandoned.

[51] Int. Cl.³ .............................................. A23G 3/28
[52] U.S. Cl. ...................................... 426/87; 426/104; 426/549
[58] Field of Search ................. 426/87, 104, 549, 250, 426/383, 297, 132

[56] References Cited

U.S. PATENT DOCUMENTS

| | | | |
|---|---|---|---|
| 919,736 | 4/1909 | Loesch | 426/87 |
| 1,931,409 | 10/1933 | Humphrey | 426/104 |
| 3,088,829 | 5/1963 | Rapaport | 426/250 |
| 3,537,406 | 11/1970 | Ort | 426/250 |
| 4,024,287 | 5/1977 | Golchert | 426/104 |

FOREIGN PATENT DOCUMENTS 17886 5/1911 United Kingdom ..................... 426/383

*Primary Examiner*—Jeanette M. Hunter
*Attorney, Agent, or Firm*—Woodcock, Washburn, Kurtz, Mackiewicz & Norris

[57] ABSTRACT

A method whereby decorative designs and the like can be formed upon baked goods by transferring a preprinted design from a transfer material to an uncooked dough surface. In one embodiment the dough surface is first covered with a thin layer of flour preparatory to transferring a water-soluble ink design to the dough. In a preferred embodiment after the dough is baked a liquid glaze is applied to the surface thereof for imparting a decorative and protective coating to the baked goods. The process of the invention is suitable for both hand and automated operation.

17 Claims, 7 Drawing Figures

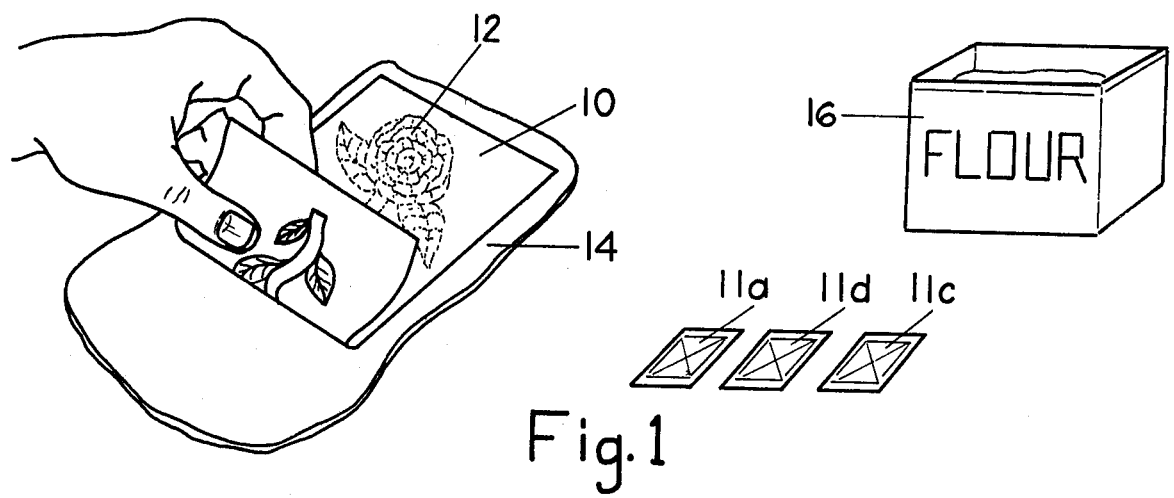
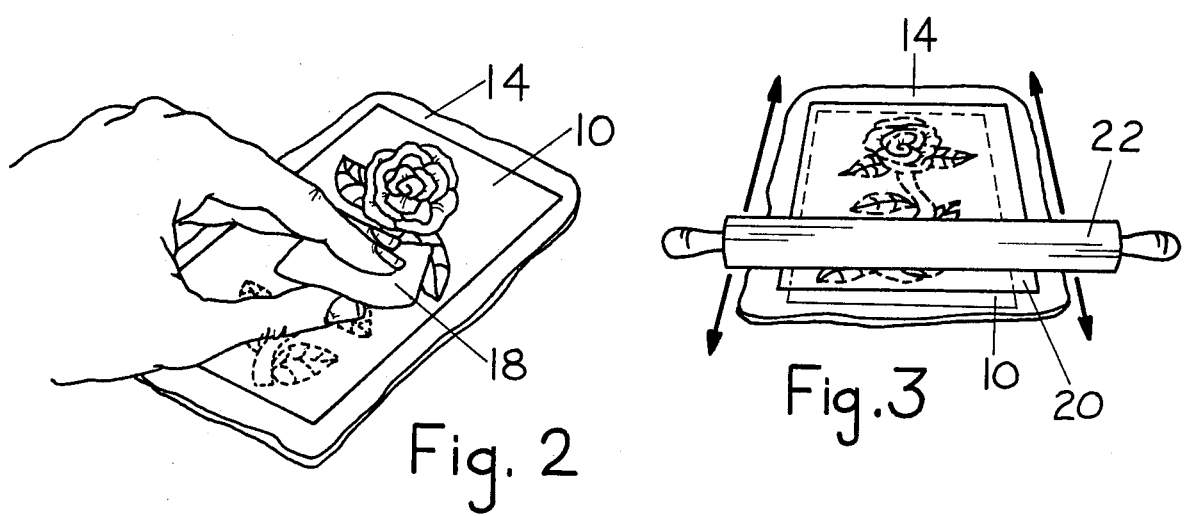
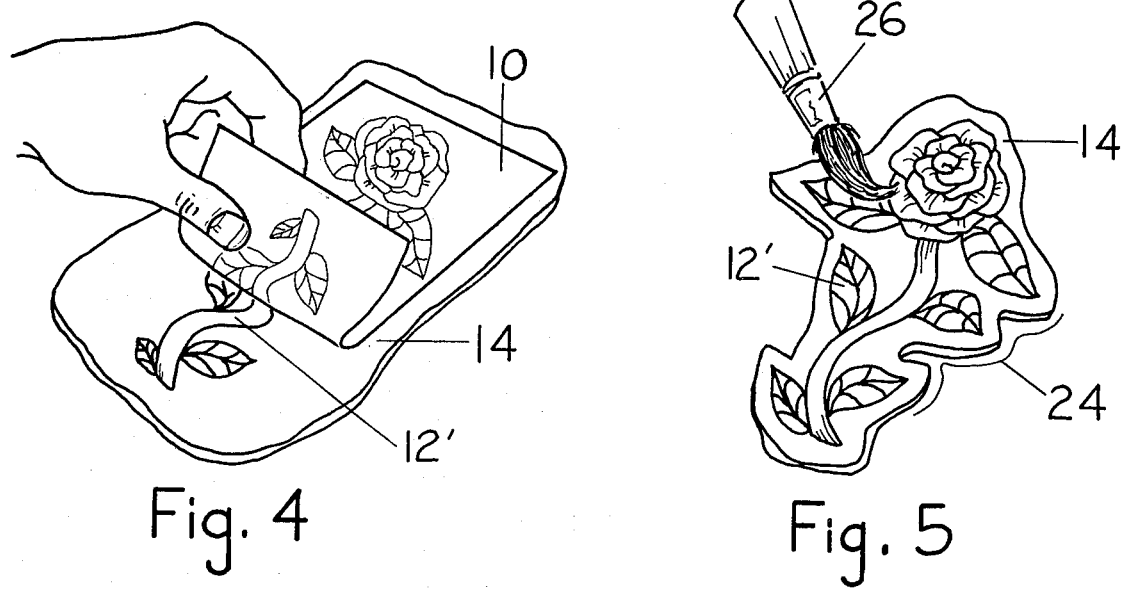

METHOD FOR DECORATING BAKED GOODS AND THE LIKE

CROSS-REFERENCE TO RELATED APPLICATIONS

This application is a continuation of copending application Ser. No. 22,627, filed Mar. 21, 1979, now abandoned which was a continuation-in-part of copending application Ser. No. 904,030, filed May 8, 1978, now abandoned.

BACKGROUND OF THE INVENTION

The present invention relates to the preparation of baked goods and the like, and more particularly to an improved method for forming designs upon the surface thereof.

The vast majority of prior art relating to decorating confections and baked goods concerns means and methods for forming three-dimensional decorations and designs, usually by the application of additional foodstuffs such as icings and the like, which are formed into the desired configuration. In a few instances the prior art discloses the application of two-dimensional designs through the use of colored inks, food dyes, and the like which are transferred to the surface of previously-cooked baked goods or confections. One example of such prior art in U.S. Pat. No. 4,024,287-Golchert in which it is disclosed that a design which has been hand-formed upon a porous transfer medium can be subsequently transferred to the surface of a cake or other pre-cooked food item. Typically, with this process designs are created by the person using the method so that the newly-prepared transfer is available for application to the confection.

One major disadvantage of such prior art approaches is that few people are sufficiently talented to hand-make a sufficiently attractive design, even if a process of tracing is resorted to. This is particularly true in the case of children. With such approaches intricate or detailed designs, multiple color designs or shading effects are extremely difficult to achieve.

Another, and even more significant, disadvantage of such prior art approaches is that they are practiced only in a final or finishing step, inasmuch as they are applied to pre-cooked items such as a cake or the like. The porous nature of some cooked food items may be prone to blur the design; and further, no means is taught whereby such a design can be permanently fixed on the surface of the food item. Indeed, if an attempt is made to cover such a design with, for instance, a protective coating, the coating material will typically dissolve the ink forming the design and cause it to smear or blur.

A second prior art approach is found in U.S. Pat. No. 3,537,406 Ort, for "Decorating Bread Products." Ort discloses applying designs to baked goods by silk-screening edible inks onto "half-proof" (i.e. partially risen) rolls or breads. This method suffers from the drawback that silk-screening permits but one color ink to be applied at a time; therefore, if it is desired to decorate a baked good with a multicolored design, several different silkscreens must be made, and a corresponding number of inking steps must be employed. In order to ensure proper registration of the several inks, so that they are each in the proper places with respect to one another, elaborate measures (complicated by the amorphous nature of dough and variations in size from one roll or loaf to the next) must be undertaken, all adding to the complexity, difficulty and expense of the operation.

It is therefore an object of the present invention to teach an improved method for forming designs upon certain food products.

Another object is to provide a method whereby complex or intricate designs may easily be formed on baked goods.

Yet another object is to provide a method whereby a transfer design may be fixed in the surface of a food product with improved resolution.

Still a further object of the invention is to provide a method of decorating baked goods prior to baking which may be practiced by hand or by machine.

A further object is to provide a readily practicable method whereby multicolored decorations may be applied to baked goods in a single application step.

SUMMARY OF THE INVENTION

Briefly stated, in accordance with one aspect of the invention the foregoing objects are achieved by providing a surface of uncooked dough which may be in the general form of the desired, finished baked goods. A transfer medium is also provided which has a pre-printed design formed by water-soluble inks. The surface of the dough is preferably dusted with a thin film of flour, then the transfer medium is applied to its surface, and moisture supplied to the transfer medium to cause the inks to leach onto the surface of the dough. In an alternative embodiment, the dough is painted with a viscous substance such as glycerin, which serves to leach the inks from the transfer. Finally the dough is formed, if necessary, into the final configuration and then cooked to fix the image. In a preferred embodiment a liquid glaze is applied to the cooked food product to cover the design, and to increase its definition.

BRIEF DESCRIPTION OF THE DRAWINGS

While the specification concludes with claims particularly pointing out and distinctly claiming the subject matter which is regarded as the invention, it is believed that the invention will be better understood from the following description of two preferred embodiments taken in conjunction with the accompanying drawings in which:

FIGS. 1 through 5 illustrate the steps in practicing the present invention upon a food product formed from dough.

DESCRIPTION OF THE PREFERRED EMBODIMENTS

Figure 6:
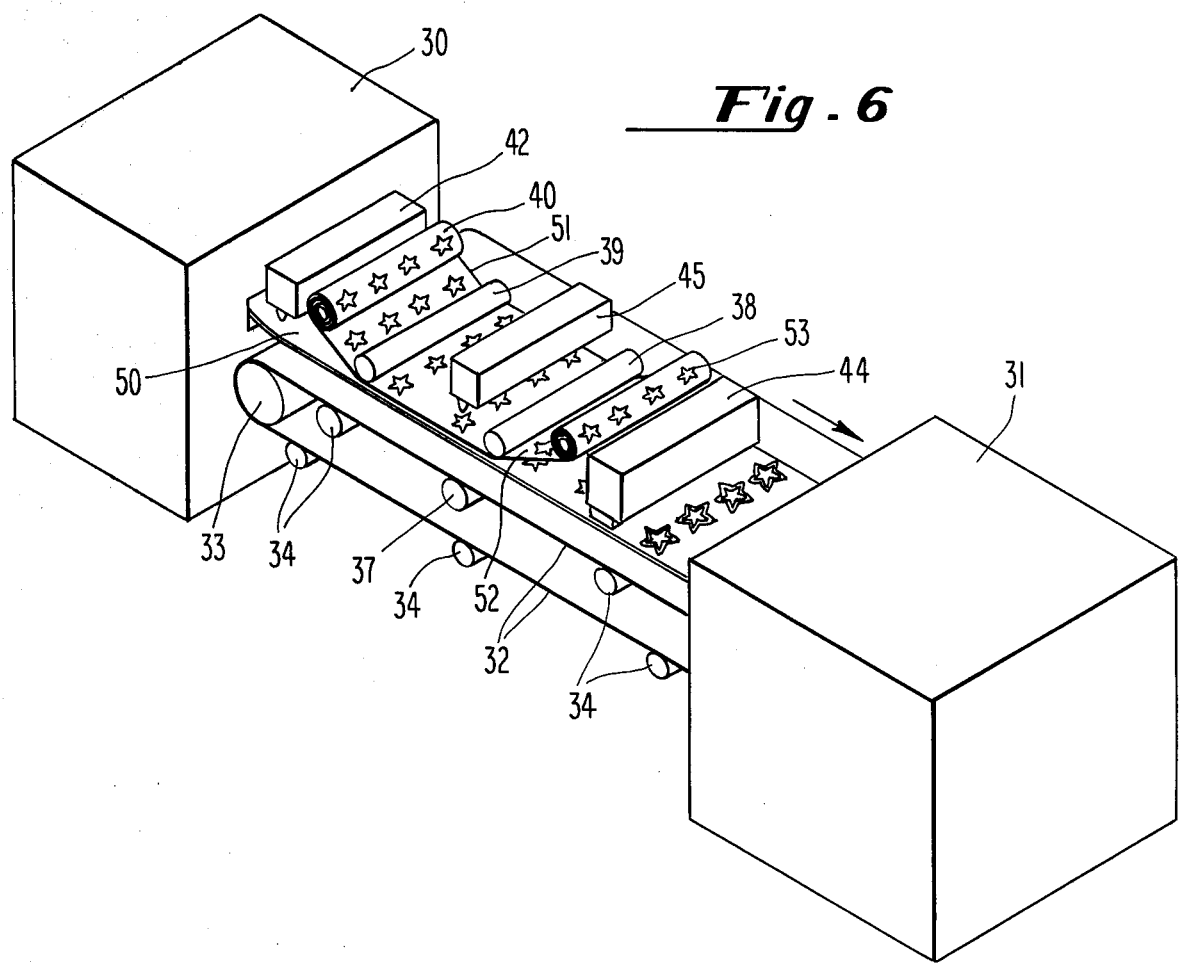
FIGS. 6 and 7 illustrate a machine suitable for the practice of the process of the invention.

In order to practice the present invention by hand, there is first prepared a transfer 10 which is typically formed of a porous material such as a tissue paper or the like. An appropriate design 12, which may be a cartoon character, a design denoting the celebration of a date, anniversary or holiday, symbols such as, e.g. stars, initials or phrases, or other decorative material, may be commercially prepared by printing a heavy layer of water-soluble ink, described in further detail below, upon the paper. While it is recognized that a relatively impermeable transfer medium may be used so that the inks lie upon the surface thereof, in a preferred embodiment a porous material is used so that moisture can saturate the latter to encourage the full dissolving of the inks. Such inks are commonly available, and in a preferred embodiment comprise food colorings which have been mixed with suitable materials such as glycerin to increase their viscosity so that a relatively heavy layer thereof may be deposited on the transfer medium.

Another suitable type of ink, which has the unusual property of being water-leachable prior to baking while being water-resistant thereafter, comprises the ingredients of Table I:

Table I

¼ teasp. commercial paste food coloring (colors selected to suit the particular design)
15 drops ordinary home-used food coloring (e.g. that made by the McCormick Co.), or water, if no additional color is needed
⅛ teasp. alum (as used for pickling
¼ teasp. powdered sugar Blending these ingredients produces a sticky, somewhat viscous ink having a consistency and color density similar to that of ordinary printers' ink, but which is edible. This ink, or a number of different-colored versions thereof, may be applied to a transfer medium, in any desired pattern by handpainting or by any one of a number of commercial printing processes. For example, in a commercial embodiment, a conventional "four color run" lithographic process might be employed to make the transfers by printing a desired pattern on a suitable transfer medium, e.g. paper. A paper useful in the practice of the process of the invention with the ink of Table I is sold by the People's Drug Co. under the name "International Airline" and appears to be an onionskin-type paper.

In addition to the fact that the ink of Table I is water-transferable prior to baking but is relatively water-resistant thereafter, it is also sufficiently thick that several (typically two or three) baked goods can be decorated with the same transfer—that is, enough ink remains on the paper after decorating a first baked good that a second baked good can be identically decorated, with no or very little loss of color density.

A food item of dough 14 is provided, and while illustrated as a flat dough sheet having indeterminate borders, it will be recognized that the dough may be formed into other shapes such as rolls, pastry and the like.

It is desirable that the dough be in a flat sheet, for reasons to be discussed below. By a "dough" is meant a pasty non-viscous uncooked food product, typically formed on a flour base and as used to form various baked goods, pie crusts, and the like. Non-solid mixes such as batters and the like are not within the contemplation of the present invention, for reasons which will become clear upon gaining an understanding of the practice of the invention. Included among the doughs contemplated for use with the invention are pre-made doughs which are sold commercially in the form of pie crusts, either frozen or unfrozen; and semi-prepared dough which is rolled or hand-formed by a consumer. Contrary to the teachings of the prior art, it is essential for the practice of the present invention that the dough be in uncooked and relatively plastic form.

According to one presently-preferred aspect of the invention the upper surface of dough 14 is dusted with flour, contained in canister 16. While a dusting of flour is not always essential, in a preferred embodiment it is used to prepare a smooth, relatively dry surface on the dough. The transfer 10 is then placed upon the surface of the dough in a desired orientation, as shown in FIG. 1.

The present inventor has discovered that oily-surfaced doughs actually receive transfers more readily if a dusting of flour is first applied, while less oily doughs will not require such a film. In order to provide a facile guide to users of the invention test strips $11_a$–$11_c$, having a bit of transfer material printed on them, may be provided, so that one or more trials may be conducted to test the receptiveness of the dough and to demonstrate the degree of wetting necessary to cause the transfer to operate. Such trials will also allow a user to rest different intensities of dustings of flour upon the dough surface.

According to the next step in practicing the invention, moisture is applied to the transfer 10 in order to dissolve some or all of the inks which form the design thereon. This causes the inks to leach out upon the surface of the dough. It is not necessary that the transfer be wet—mere dampness is sufficient. In FIG. 2 this is accomplished by applying a damp sponge 18, toweling or the like to the back of the transfer whereby moisture is distributed through the porous body of the transfer. Alternatively, and particularly when a non-porous transfer is used, the surface of dough 14 is covered with a light layer of glycerin or the like. When the transfer is applied to the glycerin-covered surface, the inks on the transfer are dissolved at least in part and in this manner transferred to the surface of the dough.

In FIG. 3 another transfer mechanism is shown whereby a sheet of dampened material 20, which may be an ordinary paper towel, is placed over the transfer 10 and a rolling pin 22 used to cause the moisture to be transferred from the toweling to the transfer. The more even pressure which is afforded by the rolling pin serves to provide a more even disposition of inks onto the surface of the dough, and frequently results in a more uniform image. It will be apparent that for this reason it is desirable, particularly in the commercial embodiment to be discussed below, that the dough be a flat sheet.

Desirably, the moistened transfer may be left on the dough for a short period of time, on the order of two minutes, in order to allow the inks to properly "set" on the dough surface.

After the foregoing steps have been completed, and as shown in FIG. 4, the transfer 10 is partially peeled back to expose transferred design 12' upon the surface of the dough. If a satisfactory degree of transfer has been achieved, the dough is ready for baking and may be cut to the desired shape. It the transfer is insufficient, an additional application of the dampened backing, as shown in FIGS. 2 or 3, is called for.

It has been found that in order to practice the present invention successfully it is desirable to practice it upon a dough having specific physical characteristics. Such a dough must be stiff, i.e., having a consistency not unlike clay so that it must be kneaded, and cannot be stirred. Further, the dough must display a smooth surface not only before baking, but also subsequent thereto. Finally, the dough should not flake, score or check during baking. Basically, then, the uncooked dough should have a texture roughly similar to that of pie dough, but unlike pie dough must not crumble or flake.

The present inventor has found that a dough having the required characteristics can be prepared from the ingredients of Table II.

TABLE II

| | |
|---|---|
| ½ cup butter or margarine | 1 teasp. almond flavoring |
| 1 egg - beaten | 1 cup confectioner's sugar |
| ½ teasp. salt | 2½ cups all-purpose flour (unsifted) |
| 1 teasp. vanilla | |

Butter and sugar are combined first then the remaining ingredients, with the exception of flour, added and the mixture blended. Subsequently, the flour is added in a gradual manner. When the mixture becomes too stiff to blend with a spoon or the like, the remaining flour is worked in by kneading the mixture by hand. The dough may be chilled for 10 or 15 minutes; in order to make it "stiffer", if desired; if the dough described above is to be stored at low temperature for an extended period of time, it should be in an airtight container.

It will be appreciated by those skilled in the art that the dough described above is an "unleavened" dough; that is, it contains no yeast, baking powder or baking soda, and will not "rise" prior to or during the baking process, due to the formation of carbon dioxide within it, as would a leavened dough, although it may swell slightly during baking. This is desirable in order that the transfer not be distorted or cracked by rising, so that it retains its original form and the density of its coloring.

Subsequent to the application of transfers, items made from the dough can be baked at approximately 375° F. for approximately 12 to 15 minutes. While still hot, the dough bearing the transfers may be painted with egg white to provide an attractive and protective glaze.

In another embodiment of the invention transfer medium 10 is formed of an edible substance. One example of such a substance is a thin layer of parchment made of rice flour, treated with a gelatinous binder when necessary. In this instance removal of the transfer medium 10 is rendered unnecessary, as the medium will blend into or upon the surface of the dough during the subsequent cooking process. The design of the transfer, however, will remain clear and visible, and will become an integral part of the final food product. With such an edible transfer medium it is still necessary to moisten the medium so that it will dissolve at least slightly, affixing itself upon the surface of the dough along with the design which is an integral part of the medium.

Dough 14 is then trimmed to an appropriate size, for instance by means of specially-formed cutters. Alternatively the trimming may be done by hand, or the dough may be placed upon another volume of uncooked food material. One example of such an approach is in the preparation of a pie, wherein a decorated sheet of dough is placed upon the pie to form an upper crust. The decorated, uncooked dough is then baked at the proper temperature to cook the dough, and fully transform the food article into a finished baked product. Such a product, represented at 24 of FIG. 5, has its upper surface constituted by the now-cooked dough 14, with the finished design 12' fixed thereon.

The present inventor has found that, contrary to normal expectations, the design formed by the food coloring-based inks disclosed above does not evaporate or become unusably faint when the design is subjected to the temperatures required to cook the dough. Further, it has been found that, although a dough may become somewhat porous due to the baking process, the design nonetheless maintains its clarity and does not become blurred due to absorption into the porous baked surface. Several advantages flow from this unexpected result: the design is permanently fixed in the food surface, and subsequent exposure to moisture will not adversely affect the design. Further, it has been determined that the baked goods may be frozen and subsequently thawed, yet without any significant injury to the design.

As a preferred final step in the practice of the present invention, a liquid glaze is applied to the surface of the finished food product by means of a brush 26 or the like. Despite the fact that the liquid glaze, which may be glycerin or a common egg white and water mixture, might be thought to dissolve and smear the image 12' in fact the inventor has found that this does not occur. This result is attributed to the "fixing" of the image as the dough bakes. Still further the application of the aforementioned liquid glaze, which is ordinarily intended to provide a glossy, attractive finish to the baked goods, actually enhances the transfer design 12' by bringing out its colors and increasing the definition and sharpness of the design. Again, this is in sharp contrast to the prior art approaches in which a design is transferred to the finished, baked product, and is not "fixed" by the baking process, so that a liquid glaze or the like would tend to at least partially dissolve the design and cause it to smear. Instead the present, improved method allows the glazing to be applied to a pre-baked design so that a more attractive and durable decorative design results.

Figure 7:
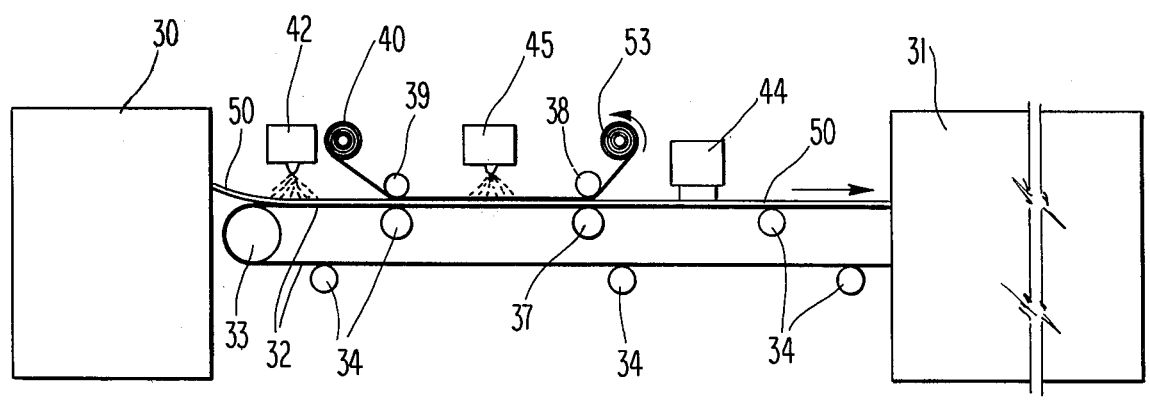

It will be appreciated by those skilled in the art that the process of the invention, including the many modifications and variations mentioned above, may be practiced either by a relatively unskilled individual by hand or may be practiced by automated machinery specifically adapted to the practice of the process of the invention. Referring now to FIGS. 6 and 7 an embodiment of a machine suitable for practicing the process of the invention is shown.

A continuous sheet of dough 50 is shown emerging from a machine 30 for manufacturing dough in accordance with, for example, the recipe given above. This continuous sheet of dough 50 is passed on to a conventional conveyor belt 32 carried on rollers 33, 34. This conveyor carries the dough through the decoration process and eventually into an oven 31.

The decoration process optionally begins with the sprinkling of flour onto the dough 50 by means of flour sprinkler 42. A continuous roll 51 of decorations, shown in this embodiment as four rows of stars, is unreeled onto the dough 50 from reel 40. The sheet of decorations 51 is then passed under a roller 39 to bring it into relatively close engagement with the sheet of dough 50. Moisture or possibly a gelatinous mixture is then applied to the sheet of decorations 51 by water sprinkler 45. The action of the water on the ink and transfer is such as to cause the inks to leach out from the transfer onto the surface of the dough which then passes under roller 38 engaged with roller 37 to exert some pressure on the transfer so as to cause the decoration to be firmly bonded to the sheet of dough 50. As discussed above, in some embodiments the transfer medium becomes part of the finished baked good. However, in the embodiment shown, the transfer is removed from the dough and decoration after the rolling step. The transfer medium 52, desirably having been dried, is wound up on a reel 53, with the decorations remaining on the dough. The dough may then optionally be passed through a stamping operation shown as 44, to form individually decorated baked goods, e.g., cookies, which may comprise a vertical stamping operation synchronized with the flow of dough thereunder or may be, for example, a roller die or may comprise other well known dough-cutting expedients. Decorated and stamped dough pieces are shown just prior to being carried into the oven 31 by the conveyor belt 32 where they are baked in the conventional manner; they may thereafter be glazed, as discussed above, and packaged for sale.

The undecorated dough can be removed by mechanical means (not shown) or by an operator and returned to the dough-making unit 30 for reuse.

As discussed above, certain preferred inks permit two or more baked goods to be individually decorated with the same transfer. In the commercial embodiment, this may be simply done by removing the roll of decorated transfer material from reel 53 and placing it on roll 40 to be reused.

As will be evident from the foregoing description, certain aspects of the invention are not limited to the particular details of the examples illustrated, and it is therefore contemplated that other modifications or applications will occur to those skilled in the art.

In particular, it will be appreciated that the process of the invention can readily be broken into several stages, each performed by a different operator. For example, in a possible commercial embodiment of the invention, preprinted transfer materials might be sold to consumers along with instructions including a recipe for dough. Alternatively, unbaked but decorated cookies could be sold, thus requiring only baking (and, optionally, glazing) by the consumer; or a "decorated cookie kit" could be sold, comprising a dough mix, preprinted decorative transfers, and suitable instructions. Thus, it is intended that the appended claims shall cover all such modifications and applications as do not depart from the true spirit and scope of the invention.

What is claimed as new and desired to be secured by Letters Patent of the United States is:

1. An improved method of decorating baked goods prepared from uncooked dough, comprising the steps of:
   providing a volume of relatively plastic uncooked unleavened dough having a smooth, generally planar upper surface and adapted, upon cooking, to form edible baked goods whose surfaces are neither flaky nor checked;
   providing a transfer medium having a pre-printed design formed on at least one surface thereof by an edible, water-soluble ink;
   applying the transfer to said upper surface of said dough;
   supplying moisture to the transfer to cause the ink to leach out onto the surface of the dough; and
   thereafter baking the dough;
   whereby a baked good is produced bearing thereon a design corresponding to the design upon said transfer medium.

2. The method of claim 1, further including the step of applying a liquid glaze to said upper surface of said baked goods to form a coating over said design.

3. The method according to claim 2, wherein said liquid glaze comprises egg white.

4. The method according to claim 1, wherein said moisture is supplied by providing a coating of glycerin on said dough surface.

5. The method according to claim 1, wherein said moisture is supplied by applying water to the surface of said transfer medium after having applied said transfer medium to said surface.

6. An improved method of providing finished baked goods with a design on the surface thereof, comprising the steps of:
   providing a flat sheet of uncooked unleavened dough having an upper surface thereon;
   providing a porous transfer medium of an edible material and having a pre-printed design formed thereon by at least one water-soluble ink;
   adjusting the moisture content of the upper surface of said dough by adding flour as necessary;
   applying the transfer to the upper surface of said uncooked dough object;
   supplying moisture to the transfer to cause said ink to leach out onto the surface of said uncooked dough object; and
   thereafter cooking said dough object to provide a baked good having a design on the surface thereof.

7. The method according to claim 6, further including the step of applying a liquid glaze to said surface of said baked good.

8. In an improved method of providing a design upon the surface of a baked good, comprising the steps of:
   providing an object of uncooked dough having a flat upper surface;
   providing a transfer medium having a pre-printed design formed thereon by water-soluble ink;
   applying a thin layer of flour to said surface;
   applying said transfer to the flour-covered surface of the uncooked dough;
   applying moisture to the exposed side of said transfer to cause said ink to leach out onto the flour-covered surface of said dough; and
   cooking said dough product to form a baked good bearing said design.

9. The method according to claim 8, further including the step of applying a liquid glaze to said surface of said baked good.

10. The method according to claim 8, wherein said transfer medium is formed of an edible material, and remains upon the surface of said baked good and becomes an integral part thereof subsequent to the step of cooking the dough.

11. The method according to claim 8, wherein said uncooked dough is sufficiently stiff to preclude stirring, exhibits a smooth surface, and does not flake or check substantially upon baking.

12. The method according to claim 8, further comprising the step of cutting the dough into desired configurations.

13. The method according to any one of the claims 1, 6 or 8, wherein the ink approximately comprises the following ingredients:
   2 parts water-based food coloring, or water
   2 parts paste food coloring
   2 parts powdered sugar
   1 part alum; and where the specific food colorings are chosen to achieve a desired ink color.

14. The method according to any one of claims 1, 6 or 8, wherein said transfer medium is edible, and is baked into the baked good during the baking step.

15. The method according to any one of claims 1, 6 or 8, wherein said transfer medium is inedible, and is removed from the surface of the baked good after the leaching step.

16. The method according to claim 15 wherein said transfer medium is reused to decorate at least a second baked good.

17. The method according to any one of claims 1, 6 or 8, wherein pressure is applied to the transfer medium during the leaching step.

* * * * *